(12) United States Patent
Hattori et al.

(10) Patent No.: US 9,558,890 B2
(45) Date of Patent: Jan. 31, 2017

(54) ELECTRONIC COMPONENT

(71) Applicant: Murata Manufacturing Co., Ltd., Nagaokakyo-shi, Kyoto-fu (JP)

(72) Inventors: Kazuo Hattori, Nagaokakyo (JP); Isamu Fujimoto, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 338 days.

(21) Appl. No.: 14/198,614

(22) Filed: Mar. 6, 2014

(65) Prior Publication Data

US 2014/0268486 A1 Sep. 18, 2014

(30) Foreign Application Priority Data

Mar. 14, 2013 (JP) .................................. 2013-052286

(51) Int. Cl.
*H01G 4/30* (2006.01)
*H01G 4/228* (2006.01)
*H01G 2/02* (2006.01)
*H01G 4/224* (2006.01)

(52) U.S. Cl.
CPC ................ *H01G 4/308* (2013.01); *H01G 2/02* (2013.01); *H01G 4/224* (2013.01); *H01G 4/228* (2013.01)

(58) Field of Classification Search
USPC ................................ 361/306.1, 306.3, 301.4
See application file for complete search history.

(56) References Cited

U.S. PATENT DOCUMENTS

| 4,324,329 A | 4/1982 | Tani |
| 6,342,681 B1 | 1/2002 | Goldberger |
| 7,697,262 B2 | 4/2010 | Ritter |
| 2004/0066589 A1 | 4/2004 | Togashi et al. |
| 2011/0110050 A1* | 5/2011 | Sakatani ............... H01L 21/563 361/746 |
| 2013/0033836 A1 | 2/2013 | Hattori et al. |
| 2013/0037911 A1 | 2/2013 | Hattori et al. |
| 2013/0081471 A1* | 4/2013 | Akiyama ................ B06B 1/067 73/649 |
| 2014/0016242 A1 | 1/2014 | Hattori et al. |

(Continued)

FOREIGN PATENT DOCUMENTS

| CN | 101937770 A | 1/2011 |
| CN | 101937770 B | 5/2012 |

(Continued)

OTHER PUBLICATIONS

Official Communication issued in corresponding Japanese Patent Application No. 2013-052286, mailed on Feb. 24, 2015.

*Primary Examiner* — Eric Thomas
(74) *Attorney, Agent, or Firm* — Keating & Bennett, LLP (57) ABSTRACT

An electronic component includes a laminated capacitor and a substrate-type terminal on which the laminated capacitor is mounted, with an viscoelastic resin located in a space between the laminated capacitor and the substrate-type terminal. The substrate-type terminal includes a substrate body, component connecting electrodes to mount the laminated capacitor are located on a component mounting surface of the substrate body, and external connecting electrodes to be connected to a circuit board are located on a substrate mounting surface of the substrate body.

19 Claims, 6 Drawing Sheets

(56) References Cited

U.S. PATENT DOCUMENTS

2014/0116768 A1* 5/2014 Hattori .................. H01G 2/065
                                                                174/260

FOREIGN PATENT DOCUMENTS

| JP | 07-212004 A | 8/1995 | | |
|---|---|---|---|---|
| JP | 2004-134430 A | 4/2004 | | |
| JP | 2006-148033 A | 6/2006 | | |
| JP | 2010-173708 A | 8/2010 | | |
| JP | 2012-204572 A | 10/2012 | | |
| JP | 2012-212943 A | 11/2012 | | |
| JP | 2012-212944 A | 11/2012 | | |
| JP | 2013-038144 A | 2/2013 | | |
| JP | 2013-038291 A | 2/2013 | | |
| WO | 2013/008549 A1 | 1/2013 | | |
| WO | 2013/008550 A1 | 1/2013 | | |
| WO | WO 2013008549 A1 * | 1/2013 | ............. | H01G 2/065 |

* cited by examiner

ELECTRONIC COMPONENT

This non-provisional application is based on Japanese Patent Application No. 2013-052286 filed on Mar. 14, 2013 with the Japan Patent Office, the entire contents of which are hereby incorporated by reference.

BACKGROUND OF THE INVENTION

1. Field of the Invention

The present invention relates to an electronic component including a laminated capacitor, and a substrate-type terminal having the laminated capacitor mounted thereon and mounted on a circuit board.

2. Description of the Related Art

Currently, chip components, and small laminated capacitors in particular, are frequently used on a circuit board of a mobile terminal such as a mobile telephone having an increasingly reduced thickness. A laminated capacitor includes a ceramic laminated body in a rectangular parallelepiped shape serving as a capacitor and including internal electrodes, and external electrodes formed on opposite end surfaces of the ceramic laminated body opposite to each other in a longitudinal direction thereof.

Generally, the laminated capacitor is electrically and physically connected to a circuit board by placing the external electrodes directly on mounting lands of the circuit board, and joining the mounting lands and the external electrodes with a joining material such as solder.

In such a laminated capacitor, small mechanical distortion occurs upon application of voltage. When this distortion is transmitted to the circuit board, audible sound, or as is commonly referred to as acoustic noise, may occur in the circuit board. To address this issue, the laminated capacitor is sometimes mounted on the circuit board with a substrate-type terminal interposed therebetween (see e.g., Japanese Patent Laying-Open No. 2004-134430 or Japanese Patent Laying-Open No. 2012-204572).

The substrate-type terminal is a substrate including an upper electrode joined to the external electrodes of the laminated capacitor, a lower electrode joined to the mounting lands of the circuit board, and a connection conductor connecting the upper and lower electrodes together.

In the configuration disclosed in Japanese Patent Laying-Open No. 2004-134430, a lower electrode and an upper electrode on an interposer substrate serving as the substrate-type terminal are arranged in directions intersecting with each other. As such, external electrodes on a laminated capacitor and mounted electrodes on a circuit board are arranged in directions intersecting with each other, resulting in difficulty in transmitting the distortion in the laminated capacitor to the circuit board. By adopting this configuration, therefore, the occurrence of acoustic noise in the circuit board can be suppressed.

A land pattern of a circuit board required to mount an interposer substrate having such a configuration on the circuit board is different in shape than a land pattern of a circuit board required to mount a laminated capacitor without an interposer substrate on the circuit board. This means that the land pattern needs to be altered, which is difficult to achieve in current circuit boards of which high-density mounting is required. Accordingly, the use of an interposer substrate having the above configuration results in difficulty in reducing the sizes of the circuit board and the like, thus contributing to increased costs.

In the configuration disclosed in Japanese Patent Laying-Open No. 2012-204572, an interposer substrate is provided with grooves extending to positions overlapping with the laminated capacitor when viewed in a direction perpendicular to an upper surface of the laminated capacitor. Thus, even if a lower electrode and an upper electrode on the interposer substrate are arranged in the same direction, the occurrence of acoustic noise in the circuit board can be suppressed. This configuration is also applicable to current circuit boards of which high-density mounting is required, without the need to alter the land pattern as described above.

However, since the recent increase in capacity of the laminated capacitor tends to increase the distortion in the laminated capacitor, the occurrence of acoustic noise in the circuit board is not sufficiently suppressed even if this configuration is adopted.

SUMMARY OF THE INVENTION

Preferred embodiments of the present invention provide an electronic component capable of significantly reducing or preventing acoustic noise in a mounted circuit board.

An electronic component according to a preferred embodiment of the present invention includes a laminated capacitor, a substrate-type terminal, and a viscoelastic resin. The laminated capacitor includes a laminated body with a rectangular or substantially rectangular parallelepiped shape including a dielectric layer and an internal electrode laminated therein, and a first external electrode and a second external electrode electrically connected to the internal electrode and located on opposite end surfaces of the laminated body located in a longitudinal direction thereof, respectively. The substrate-type terminal includes an insulative substrate body, a first component connecting electrode located on a first main surface of the substrate body on a side where the laminated capacitor is arranged, and connected to the first external electrode, a second component connecting electrode located on the first main surface of the substrate body and connected to the second external electrode, a first external connecting electrode located on a second main surface of the substrate body opposite to the first main surface, a second external connecting electrode located on the second main surface of the substrate body, a first connecting electrode connecting the first component connecting electrode to the first external connecting electrode, and a second connecting electrode connecting the second component connecting electrode to the second external connecting electrode. The viscoelastic resin completely or substantially completely fills a space between the substrate-type terminal and the laminated body of the laminated capacitor.

With this configuration, vibration caused by distortion that occurs in the laminated capacitor is attenuated by the viscoelastic resin located in the space between the laminated capacitor and the substrate-type terminal. As a result, propagation of the vibration to a circuit board is reduced to prevent or significantly reduce the occurrence of acoustic noise.

Preferably, in the electronic component according to a preferred embodiment of the present invention, the viscoelastic resin is provided between the end surfaces of the laminated body.

With this configuration, the transmission of vibration is significantly reduced or prevent compared to an example where the viscoelastic resin is located on the end surfaces of the external electrodes.

Preferably, in the electronic component according to a preferred embodiment of the present invention, the viscoelastic resin has a glass transition temperature of not less than about 20° C. and not more than about 70° C., for example.

A loss coefficient (namely, a loss elastic modulus/a storage elastic modulus) of viscoelastic resin tends to increase in the vicinity of a glass transition temperature of the viscoelastic resin. Thus, by setting the glass transition temperature of the viscoelastic resin near the temperature during operation of the circuit (not less than about 20° C. and not more than about 70° C., for example) in this manner, transmission of vibration caused by expansion and contraction of the laminated capacitor is readily attenuated, to significantly reduce or prevent the occurrence of acoustic noise in the circuit board more readily.

Preferably, in the electronic component according to a preferred embodiment of the present invention, the viscoelastic resin has a loss elastic modulus/a storage elastic modulus of not less than about 0.05 within a temperature range of not less than about 20° C. and not more than about 70° C., for example.

With this configuration, transmission of vibration caused by expansion and contraction of the laminated capacitor is more readily attenuated, to further reduce or prevent the occurrence of acoustic noise in the circuit board.

Preferably, in the electronic component according to a preferred embodiment of the present invention, a side surface of the substrate-type terminal that is perpendicular or substantially perpendicular to the first main surface of the substrate body and extending in the longitudinal direction of the laminated body is coplanar with a side surface of the viscoelastic resin that is perpendicular or substantially perpendicular to the first main surface of the substrate body and extending in the longitudinal direction of the laminated body.

With this configuration, the electronic component can be manufactured, for example, by dropping and curing the viscoelastic resin on a parent substrate prior to the cutting of the substrate-type terminal, and then by cutting the substrate-type terminal. Thus, an increase in width dimension of the electronic component is prevented also in the structure having the viscoelastic resin as described above.

In the electronic component according to a preferred embodiment of the present invention, the substrate body may be provided with a pair of grooves extending from opposite end surfaces of the substrate body located in the longitudinal direction of the laminated body to positions overlapping the laminated capacitor when viewed in a direction perpendicular or substantially perpendicular to the first main surface of the substrate body. In this case, preferably, the pair of grooves include the first connecting electrode and the second connecting electrode therein, respectively.

With this configuration, if a joining material such as solder is supplied in an excessive amount, an amount of the joining material wetting and spreading on the end surfaces of the external electrodes of the laminated capacitor is significantly reduced, to significantly reduce or prevent the occurrence of acoustic noise.

When the laminated capacitor is mounted on the circuit board by utilizing the configuration of the electronic component according to a preferred embodiment of the present invention, the viscoelastic resin located in the space between the laminated capacitor and the substrate-type terminal absorbs at least part of the vibration that occurs in the laminated capacitor to reduce the amplitude of vibration transmitted to the circuit board, thus significantly reducing or preventing the occurrence of acoustic noise in the circuit board.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

An electronic component 1 according to a first preferred embodiment of the present invention will be described below.

Electronic component 1 includes a laminated capacitor 2 described later, and a substrate-type terminal 3 described later. Examples of the laminated capacitor include a laminated ceramic capacitor including ceramic as a dielectric material, and a laminated metallized film capacitor including a resin film as a dielectric material. A laminated ceramic capacitor will be described herein by way of example.

Figure 1A:
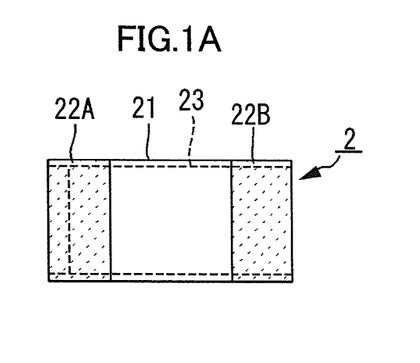
FIGS. 1A to 1C are a plan view, a front view and a right-side view, respectively, showing the configuration of a laminated capacitor included in an electronic component according to a first preferred embodiment of the present invention.
Figure 1B:
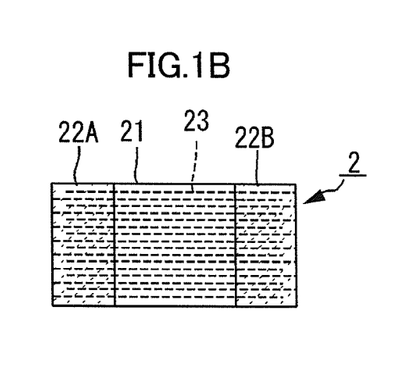
Figure 1C:
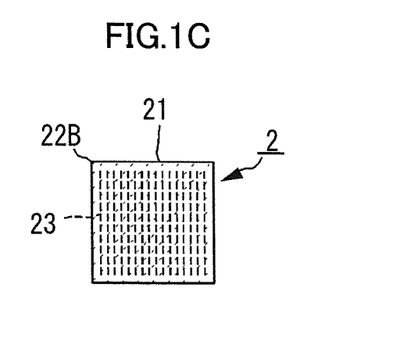
Figure 2A:
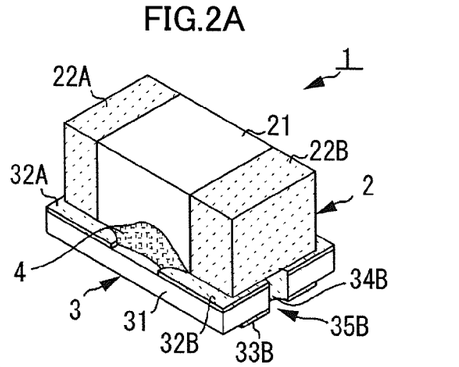
FIGS. 2A to 2E are a perspective view, a plan view, a front view, a right-side view and a bottom view, respectively, showing the configuration of the electronic component according to the first preferred embodiment of the present invention.
Figure 2B:
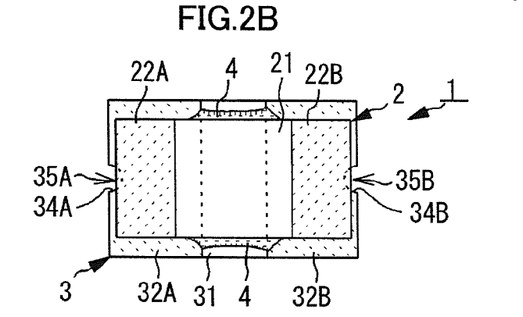
Figure 2C:
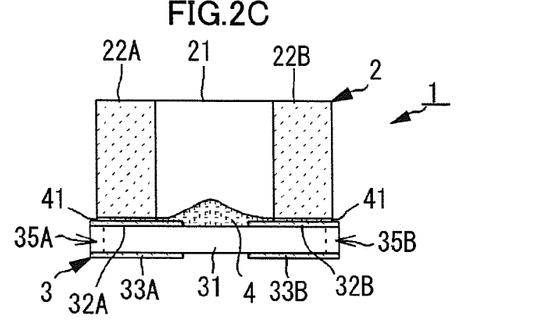
Figure 2D:
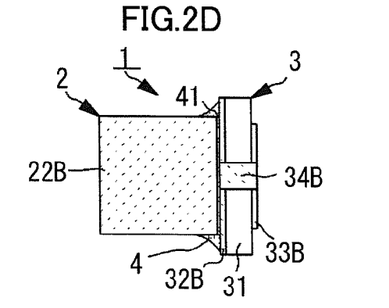
Figure 2E:
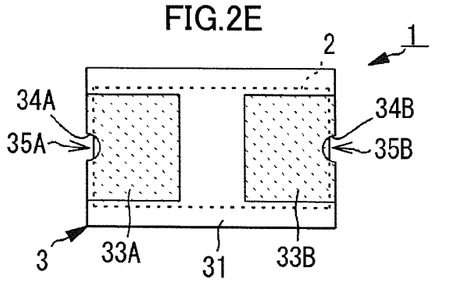

FIGS. 1A to 1C are a plan view, a front view and a right-side view of laminated capacitor 2, respectively.

Laminated capacitor 2 includes a laminated body 21, external electrodes 22A and 22B, and internal electrodes 23. Laminated body 21 preferably has a rectangular or substantially rectangular parallelepiped shape, with a first end surface (left-side surface) and a second end surface (right-side surface) located opposite to each other in a longitudinal direction each having a square or substantially square shape, and preferably is formed by laminating a plurality of ceramic dielectric layers in a lateral direction (direction perpendicular or substantially perpendicular to the above longitudinal direction). Laminated body 21 includes a first main surface and a second main surface connected to the first and second end surfaces described above and arranged perpendicular or substantially perpendicular to the direction of lamination, and a first side surface and a second side surface connected to the first and second end surfaces described above and arranged parallel or substantially parallel to the direction of lamination. Internal electrodes 23 are laminated with the dielectric layers interposed therebetween in laminated body 21. The first and second end surfaces are not limited to having a square or substantially square shape as described above, and may have a rectangular or substantially rectangular shape with a reduced length in the direction of lamination, for example.

External electrode 22A is provided on the first end surface (left-side surface) of laminated body 21, and extends to a portion of each of four surfaces (the above-described first main surface, second main surface, first side surface and second side surface) connected to the first end surface of laminated body 21. External electrode 22B is provided on the second end surface (right-side surface) of laminated body 21, and extends to a portion of each of four surfaces (the above-described first main surface, second main surface, first side surface and second side surface) connected to the second end surface of laminated body 21. External electrodes 22A and 22B are only required to be provided on at least one surface of laminated body 21.

External electrodes 22A and 22B may be plated with a prescribed metal in consideration of corrosion resistance and conductivity. Laminated capacitor 2 may have commonly used outer dimensions, for example, a longitudinal dimension×a lateral dimension of approximately 3.2 mm×1.6 mm, 2.0 mm×1.25 mm, 1.6 mm×0.8 mm, 1.0 mm×0.5 mm, 0.8 mm×0.4 mm, or 0.6 mm×0.3 mm.

FIGS. 2A to 2E are a perspective view, a plan view, a front view, a right-side view and a bottom view of electronic component 1, respectively.

Electronic component 1 includes the above-described laminated capacitor 2 mounted on substrate-type terminal 3, with an viscoelastic resin 4 filling completely or substantially completely the space (gap) between laminated capacitor 2 and substrate-type terminal 3. When laminated capacitor 2 is mounted on a component mounting surface of substrate-type terminal 3, a bottom surface of laminated capacitor 2 facing the component mounting surface of substrate-type terminal 3 may be any of the above-described first main surface, second main surface, first side surface and second side surface. If laminated capacitor 2 is mounted on substrate-type terminal 3 with one of the first and second main surfaces serving as the bottom surface facing substrate-type terminal 3, internal electrodes 23 and the component mounting surface of substrate-type terminal 3 are parallel or substantially parallel to each other. If laminated capacitor 2 is mounted on substrate-type terminal 3 with one of the first and second side surfaces serving as the bottom surface facing substrate-type terminal 3, internal electrodes 23 and the mounting surface of substrate-type terminal 3 are perpendicular or substantially perpendicular to each other.

Substrate-type terminal 3 includes a substrate body 31, component connecting electrodes 32A and 32B, external connecting electrodes 33A and 33B, and connecting electrodes 34A and 34B.

Substrate body 31 is made of insulating resin, for example. Substrate body 31 preferably has a thickness of about 0.05 mm to about 1.0 mm, for example, in a direction perpendicular or substantially perpendicular to the first and second main surfaces of substrate body 31. Substrate body 31 includes the above-described first main surface on which laminated capacitor 2 is mounted, and the above-described second main surface opposite to the first main surface. The first main surface of substrate body 31 defines and serves as the component mounting surface of substrate-type terminal 3. Substrate body 31 includes a first end surface and a second end surface perpendicular or substantially perpendicular to the first and second main surfaces of substrate body 31 and along a lateral direction of substrate body 31, and a first side surface and a second side surface perpendicular or substantially perpendicular to the first and second main surfaces of substrate body 31 and along a longitudinal direction of substrate body 31. Substrate body 31 has a rectangular or substantially rectangular planar shape when viewed in a direction perpendicular or substantially perpendicular to the first main surface. The outer dimensions of substrate body 31 as viewed in this direction may be larger than, equal to, or smaller than the outer dimensions of laminated capacitor 2. In consideration of postural stability, the longitudinal dimension of substrate body 31 is preferably not less than about 0.8 times, and more preferably not less than about 0.9 times, for example, the longitudinal dimension (L) of laminated capacitor 2. The lateral dimension of substrate body 31 is preferably not less than about 0.8 times, and more preferably not less than 0.9 times, for example, the lateral dimension (W) of laminated capacitor 2. Furthermore, in consideration of a mounting area, the longitudinal dimension is preferably not more than about 2.0 times, and more preferably not more than about 1.5 times, for example, the longitudinal dimension (L) of laminated capacitor 2. The lateral dimension of substrate body 31 is preferably not more than about 2.0 times, and more preferably not more than about 1.5 times, the lateral dimension (W) of laminated capacitor 2. In this preferred embodiment, substrate body 31 preferably has a planar shape slightly larger than the planar shape of laminated capacitor 2. For example, the planar shape of substrate body 31 is at a prescribed ratio relative to the planar dimensions of laminated capacitor 2, and projects for a prescribed distance from the planar shape of laminated capacitor 2.

The first and second end surfaces of substrate body 31 are provided with grooves 35A and 35B passing through the first and second main surfaces of substrate body 31, respectively. Grooves 35A and 35B each have an arc shape or substantially an arc shape when viewed in the direction perpendicular or substantially perpendicular to the first main surface. Grooves 35A and 35B partially extend below the bottom surface of laminated capacitor 2 when viewed in the direction perpendicular or substantially perpendicular to the first main surface. In other words, laminated capacitor 2 is mounted on substrate-type terminal 3 in such a manner that external electrodes 22A and 22B overlap with grooves 35A and 35B, respectively.

Component connecting electrodes 32A and 32B are arranged in the longitudinal direction on the first main surface of substrate body 31. Component connecting electrode 32A preferably has a rectangular or substantially rectangular shape on the first main surface of substrate body 31 close to the first end surface, and reaches an edge of the first main surface connected to the first end surface and edges of the first main surface connected to the first and second side surfaces. Component connecting electrode 32B preferably has a rectangular or substantially rectangular shape on the first main surface of substrate body 31 close to the second end surface, and reaches an edge of the first main surface connected to the first end surface and edges of the first main surface connected to the first and second side surfaces. It is to be noted that component connecting electrodes 32A and 32B may be provided at a prescribed distance from the first end surface, the second end surface, the first side surface and the second side surface of substrate body 31. These component connecting electrodes 32A and 32B are joined to external electrodes 22A and 22B of laminated capacitor 2, respectively. They may be joined with any method. For example, they may be joined by plating component connecting electrodes 32A, 32B and external electrodes 22A, 22B with a remeltable metal (e.g., tin) in advance, and remelting the plated metal. By using such a joining method, a joint layer 41 made of the remolten plated metal is provided between component connecting electrodes 32A, 32B and external electrodes 22A, 22B, to electrically and mechanically connect them together. Alternatively, laminated capacitor 2 and substrate-type terminal 3 may be joined with another joining method such as by utilizing a joining material such as solder.

Component connecting electrodes 32A and 32B may have a planar shape that substantially matches the planar shape of external electrodes 22A and 22B of laminated capacitor 2. In this case, laminated capacitor 2 is reliably mounted in a desired position by a so-called self-alignment effect. The higher the accuracy of the mounting position of laminated capacitor 2, the more effective it is to prevent a joining material to mount electronic component 1 on a circuit board from wetting and spreading on external electrodes 22A and 22B of laminated capacitor 2 during the mounting.

External connecting electrodes 33A and 33B are arranged in the longitudinal direction on the second main surface of substrate body 31. External connecting electrode 33A preferably has a rectangular or substantially rectangular shape on the second main surface of substrate body 31 close to the first end surface, reaches an edge of the second main surface connected to the first end surface, and is positioned at a prescribed distance from the first and second end surfaces. External connecting electrode 33B preferably has a rectangular or substantially rectangular shape on the second main surface of substrate body 31 close to the second end surface, reaches an edge of the second main surface connected to the first end surface, and is positioned at a prescribed distance from the first and second end surfaces. It is to be noted that external connecting electrodes 33A and 33B may be smaller than the width over the entire length of a boundary line between the bottom surface and the first or second end surface of substrate body 31 so that they are positioned at a prescribed distance from the first end surface, the second end surface, the first side surface or the second side surface of substrate body 31, or may be formed without such a distance. The shape of external connecting electrodes 33A and 33B may be determined depending on mounting lands of the circuit board on which electronic component 1 is to be mounted.

Connecting electrodes 34A and 34B are provided on arc-shaped or substantially arc-shaped side wall surfaces of grooves 35A and 35B provided in substrate body 31, respectively. Connecting electrode 34A is provided on groove 35A to provide electrical conduction between component connecting electrode 32A and external connecting electrode 33A. Connecting electrode 34B is provided on groove 35B to provide electrical conduction between component connecting electrode 32B and external connecting electrode 33B. Connecting electrodes 34A and 34B may be so-called via conductors provided to pass through substrate body 31 in a thickness direction.

A plurality of electronic components 1 may be simultaneously manufactured by using a large parent substrate prior to cutting into substrate-type terminals 3. For example, by placing laminated capacitors 2 on a component mounting surface of the parent substrate to join external electrodes 22A, 22B and component connecting electrodes 32A, 32B, then dropping a liquid viscoelastic resin material on the parent substrate, and curing the viscoelastic resin material to form viscoelastic resin 4 made of viscoelastic resin, a plurality of electronic components 1 can be subsequently cut from the parent substrate. In this case, the viscoelastic resin material is dropped on substrate-type terminal 3 on which laminated capacitor 2 has been mounted, so that the viscoelastic resin material enters the space (gap) between laminated capacitor 2 and substrate-type terminal 3 by capillary action, thus filling completely or substantially completely the space with viscoelastic resin 4. Thus, the viscoelastic resin material is preferably dropped after laminated capacitor 2 has been mounted on substrate-type terminal 3, in an amount equal to or higher than a certain amount. The amount of dropped viscoelastic resin material may be such that viscoelastic resin 4 is provided only in a region where substrate body 31 is exposed between component connecting electrodes 32A and 32B, as is illustrated, or may be such that viscoelastic resin 4 is provided also on component connecting electrodes 32A and 32B. If the viscoelastic resin material is dropped in a higher amount, viscoelastic resin 4 will not project outside of the side surfaces of substrate-type terminals 3, since electronic component 1 is obtained by being cut together with under fill 4 from the parent substrate after the viscoelastic resin material is cured. In other words, by manufacturing electronic component 1 according to the above procedure, the side surfaces of viscoelastic resin 4 are coplanar with the first and second side surfaces of substrate-type terminals 3, thus attaining high-density mounting on the circuit board without increasing the mounting area of electronic component 1.

Epoxy resin or urethane resin containing a curing agent, an inorganic filler and the like is used, for example, as viscoelastic resin 4 made of viscoelastic resin. The viscoelastic properties of viscoelastic resin include a glass transition temperature, a storage elastic modulus, and a loss elastic modulus. These physical properties can be measured with a dynamic viscoelasticity measurement apparatus (DMA). The viscoelastic properties can be measured, for example, by preparing a viscoelastic resin formed as a flat plate and having a similar composition, and applying a vibration load of 10 Hz to the resin by three-point bending or by tension while raising the temperature of the resin from about −20° C. to about 200° C. at a rate of raising temperature of about 5° C./min, for example. The storage elastic modulus and the loss elastic modulus can be measured with the DMA, and a temperature at which a loss coefficient (tan δ) represented by the loss elastic modulus/the storage elastic modulus exhibits a peak can be defined as the glass transition temperature.

Figure 3A:
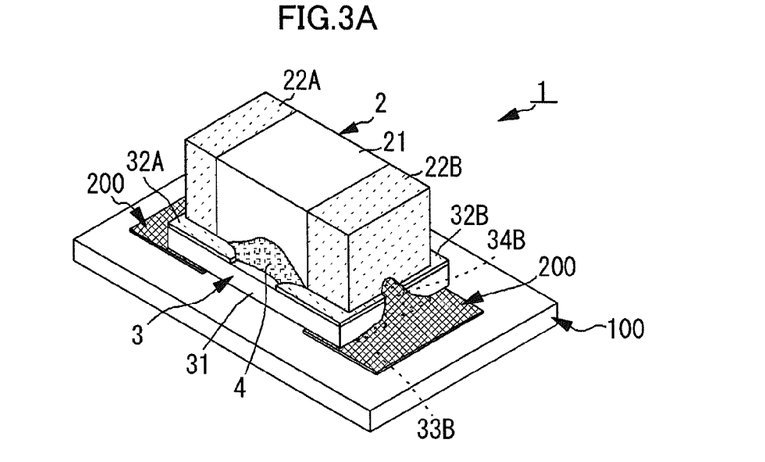
FIGS. 3A to 3C are a perspective view, a front view and a right-side view, respectively, showing a state in which the electronic component according to the first preferred embodiment of the present invention is mounted.
Figure 3B:
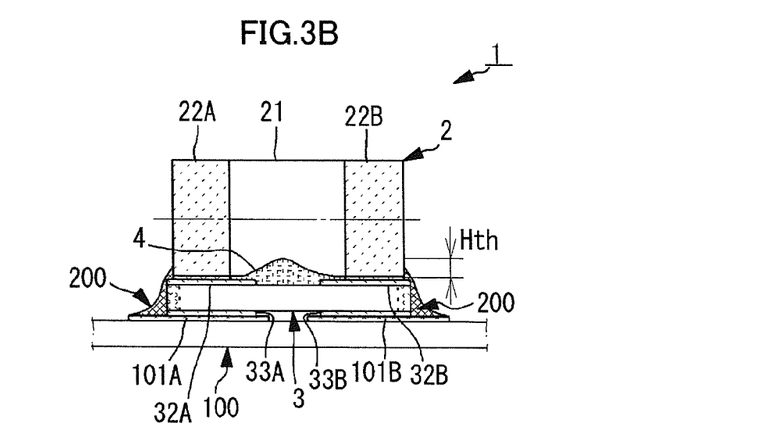
Figure 3C:
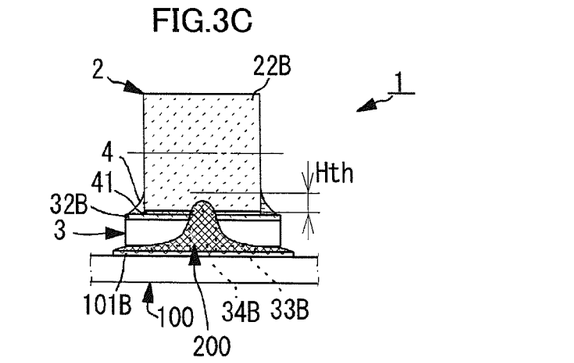
Figure 4A:
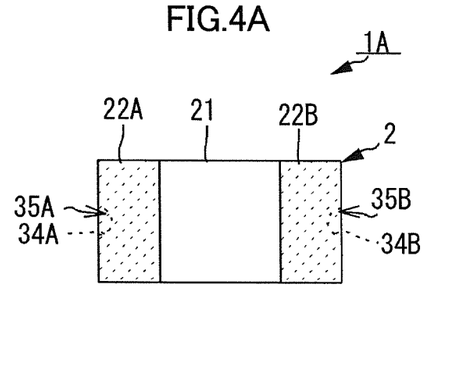
FIGS. 4A to 4D are a plan view, a front view, a right-side view and a bottom view, respectively, showing the configuration of an electronic component according to a second preferred embodiment of the present invention.
Figure 4B:
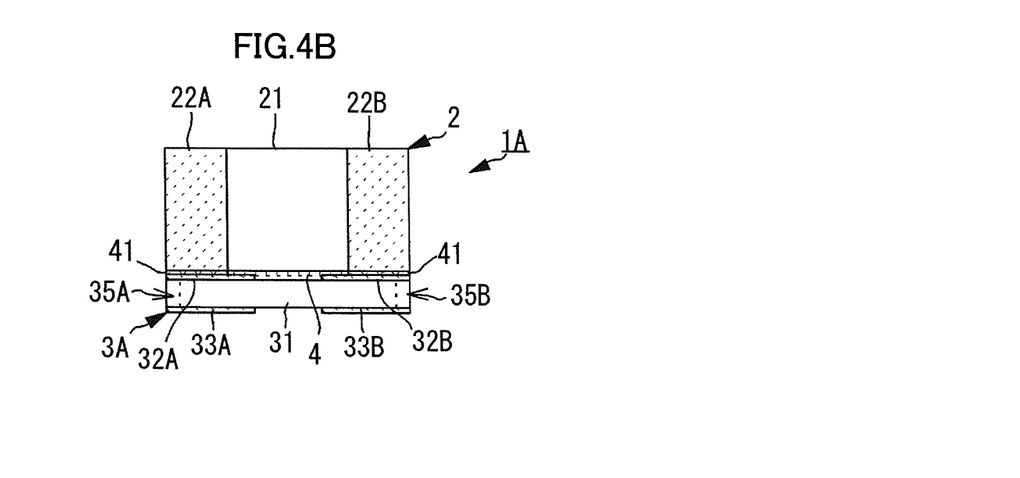
Figure 4C:
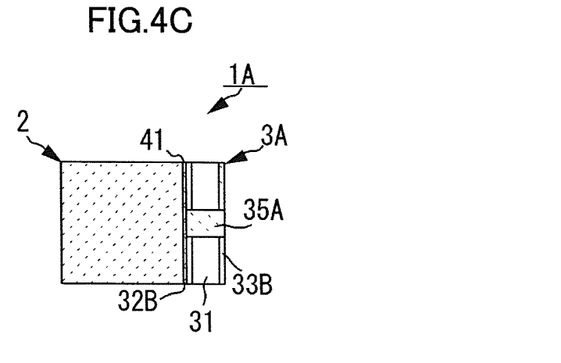
Figure 4D:
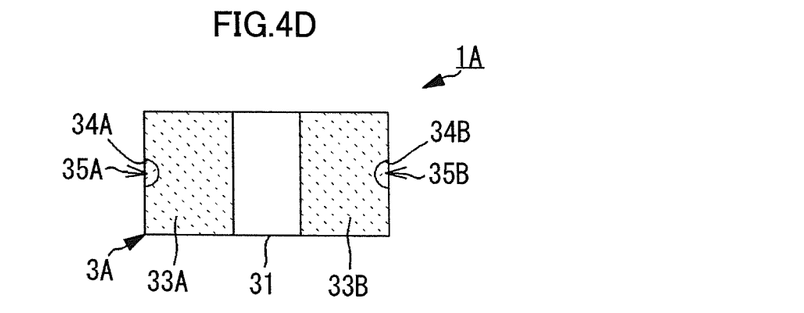

FIG. 3A is a perspective view of a state in which electronic component 1 has been mounted on a circuit board 100. FIGS. 3B and 3C are a front view and a right-side view of this state, respectively.

Electronic component 1 is mounted on circuit board 100 with a solder 200 as a joining material. Circuit board 100 includes mounting lands 101A and 101B on which a solder paste is applied. Electronic component 1 is mounted on circuit board 100 by bringing external connecting electrodes 33A and 33B of electronic component 1 into contact with mounting lands 101A and 101B, and melting and solidifying the solder paste in this state. By melting and solidifying the solder paste, the molten solder wets and spreads on connecting electrodes 34A and 34B of electronic component 1, to form fillets of solder 200.

The fillets of solder 200 are preferably formed at least from mounting lands 101A and 101B to connecting electrodes 34A and 34B. The fillets thus join electronic component 1 and circuit board 100 with a sufficient joint strength. The fillets also prevent electronic component 1 from coming off of circuit board 100. Furthermore, joint failure can be visually checked from the shape of the fillets. The joining material may be any joining material having appropriate wettability and conductivity, other than solder 200.

Solder 200 may wet and spread on the component mounting surface of substrate-type terminals 3 when supplied in an excessive amount. In the configuration of this preferred embodiment where the first and second end surfaces of substrate-type terminals 3 are spaced apart from the first and second end surfaces of laminated capacitor 2, it is difficult for solder 22 that has wet and spread onto the first main surface of substrate-type terminals 3 to reach the end surfaces of external electrodes 22A and 22B. Furthermore, since connecting electrodes 34A and 34B are provided on the side wall surfaces of grooves 35A and 35B extending below the bottom surface of laminated capacitor 2, solder 200 is prevented from continuing to wet and spread on the bottom surface of laminated capacitor 2 when wetting and spreading on substrate-type terminal 3, resulting in difficulty for solder 200 to wet and spread onto the component mounting surface of substrate-type terminals 3. Thus, if the solder is supplied in a slightly excessive amount, an amount of solder 200 wetting and spreading onto the end surfaces of external electrodes 22A and 22B provided on the first and second end surfaces of laminated capacitor 2 are significantly reduced or prevented. For example, if the solder is supplied in an amount substantially equal to the amount when laminated capacitor 2 is directly mounted on mounting lands 101A and 101B, a height (Hth) of solder 200 wetting and spreading onto the end surfaces of external electrodes 22A and 22B is limited preferably to about ¼ to about ⅓ at a maximum from the bottom surface, for example. As such, laminated capacitor 2 and circuit board 100 are indirectly joined with substantially only substrate-type terminal 3 interposed therebetween.

In electronic component 1 thus mounted on circuit board 100, small distortion occurs in laminated capacitor 2 upon application of voltage from mounting lands 101A and 101B. This distortion in laminated capacitor 2 is transmitted to circuit board 100 through substrate-type terminal 3.

More specifically, the distortion in laminated capacitor 2 is transmitted to circuit board 100 through the joints between external electrodes 22A, 22B and component connecting electrodes 32A, 32B, and viscoelastic resin 4 filling the space between laminated capacitor 2 and substrate-type terminal 3. At this time, vibration caused by the distortion in laminated capacitor 2 and transmitted from laminated capacitor 2 to circuit board 100 is partially attenuated by viscoelastic resin 4 made of viscoelastic resin, to significantly reduce or prevent the occurrence of acoustic noise in circuit board 100.

Viscoelastic resin 4 made of viscoelastic resin is preferably provided between the end surfaces of laminated capacitor 2. The vibration is strong in the end surfaces of external electrodes 22A and 22B. If viscoelastic resin 4 is provided on the end surfaces of external electrodes 22A and 22B, the vibration in laminated capacitor 2 is readily transmitted through viscoelastic resin 4 to circuit board 100. By forming viscoelastic resin 4 so that it is located between the end surfaces of laminated body 21 as described above, therefore, the formation of viscoelastic resin 4 on the end surfaces of external electrodes 22A and 22B is prevented, to significantly reduce or prevent the occurrence of acoustic noise in circuit board 100.

Viscoelastic resin 4 made of viscoelastic resin preferably has a glass transition temperature Tg of not less than about 20° C. and not more than about 70° C., for example. In the vicinity of the glass transition temperature, viscoelastic resin 4 has a high loss coefficient, thus increasing the effect of attenuating the vibration. By adopting the above configuration, therefore, the occurrence of acoustic noise in circuit board 100 is significantly reduced or prevented if distortion occurs in laminated capacitor 2 within a temperature range of about 20° C. to about 70° C., for example, which is a typical temperature of the circuit board during operation of the circuit board. Epoxy resin may be envisaged as the viscoelastic resin, for example, however, it has a high glass transition temperature Tg of about 140° C. Thus, if a resin having a low glass transition temperature such as urethane resin (e.g., Tg=−85° C.) preferably is added together with a curing agent to the epoxy resin, viscoelastic resin 4 having a glass transition temperature of not less than about 20° C. and not more than about 70° C. can be obtained, for example.

Viscoelastic resin 4 made of viscoelastic resin preferably has a loss coefficient (loss elastic modulus/storage elastic modulus) of not less than about 0.05 within the temperature range of not less than about 20° C. and not more than about 70° C., for example. The loss coefficient is more preferably not less than about 0.01, for example. In this case, if distortion occurs in laminated capacitor 2 within the temperature range of about 20° C. to about 70° C., for example, which is a temperature during operation of the circuit board, vibration caused by this distortion is effectively attenuated, to further reduce or prevent the occurrence of acoustic noise in circuit board 100. Examples of viscoelastic resin having a loss coefficient of not less than about 0.05 or not less than about 0.1 include vinyl chloride-based resin, butyl rubber, polyamide resin, and polymer blend resin having two or more types of resins blended therein. When these resins are used, the glass transition temperature can be further adjusted as described above.

Second Preferred Embodiment

FIGS. 4A to 4D are a plan view, a front view, a right-side view and a bottom view, respectively, of an electronic component 1A according to a second preferred embodiment of the present invention.

Electronic component 1A in this preferred embodiment is the same as electronic component 1 in the first preferred embodiment in structure of laminated capacitor 2, but is different in that a substrate-type terminal 3A of a different size is provided. In the following description, therefore, the elements corresponding to those in the first preferred embodiment are designated by the same reference characters in the drawings and description thereof will not be repeated.

When viewed two-dimensionally, the outer shape of substrate-type terminal 3A is preferably the same as the outer shape of laminated capacitor 2 other than portions where grooves 35A and 35B are provided. As such, the entire arc-shaped or substantially arc-shaped portions of grooves 35A and 35B provided on the end surfaces located in the longitudinal direction of substrate body 31 extend below the bottom surfaces of external electrodes 22A and 22B of laminated capacitor 2, respectively. External connecting electrodes 33A and 33B provided on the bottom surface of substrate body 31 each have a width over the entire length of the boundary line between the bottom surface (second main surface) and the first or second end surface of substrate body 31, and define a rectangular region extending inward for a prescribed distance from the boundary line.

With this configuration, the effect of significantly reducing or preventing the vibration noise similar to above is achieved. That is, distortion that occurs in laminated capacitor 2 is partially absorbed by viscoelastic resin 4 filling completely or substantially completely the space between laminated capacitor 2 and substrate-type terminals 3A, to significantly reduce or prevent the occurrence of acoustic noise in the circuit board. Such a configuration can be formed by cutting substrate-type terminal 3A after dropping and curing an viscoelastic resin material on a parent substrate.

In this preferred embodiment, the first and second end surfaces of substrate-type terminal 3A overlap with the first and second end surfaces of laminated capacitor 2 when viewed two-dimensionally, and the entire grooves 35A and 35B extend below the bottom surface of laminated capacitor 2, with connecting electrodes 34A and 34B provided on the arc-shaped or substantially arc-shaped side wall surfaces forming grooves 35A and 35B, respectively. Accordingly, the joining material wets and spreads on the component end surfaces of laminated capacitor 2 through connecting electrodes 34A, 34B and the bottom surface of laminated capacitor 2. Therefore, the joining material wetting and spreading onto external electrodes 22A and 22B of laminated capacitor 2 from the mounting lands of the circuit board is eliminated or reduced to an extremely small amount, to prevent the joining material from wetting and spreading on external electrodes 22A and 22B to a high level.

Furthermore, in the configuration of this preferred embodiment where the area of substrate-type terminals 3A is preferably the same as the area of single laminated capacitor 2 when viewed two-dimensionally, the mounting area is not increased if substrate-type terminals 3A are used. Thus, electronic component 1A can be mounted with a minimum mounting area.

Third Preferred Embodiment

Figure 5A:
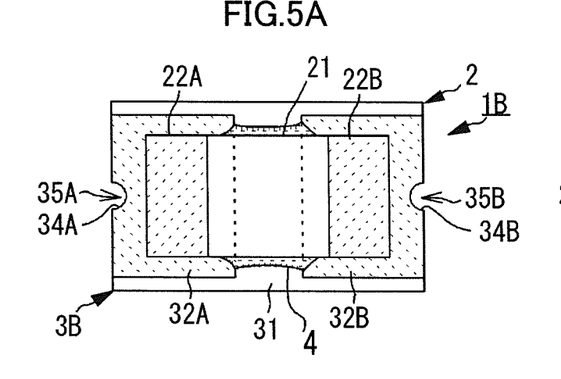
FIGS. 5A to 5C are a plan view, a front view and a right-side view, respectively, showing the configuration of an electronic component according to a third preferred embodiment of the present invention.
Figure 5B:
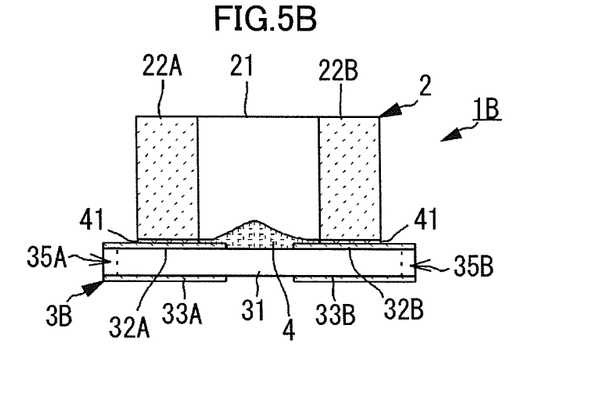
Figure 5C:
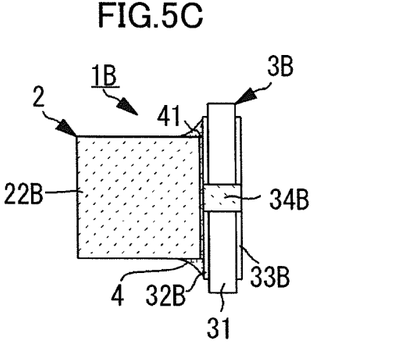

FIGS. 5A to 5C are a plan view, a front view and a right-side view of an electronic component 1B according to a third preferred embodiment of the present invention, respectively.

Electronic component 1B in this preferred embodiment is preferably the same as electronic component 1 in the first preferred embodiment in structure of laminated capacitor 2, but is different in that a substrate-type terminal 3B of a different size is provided. In the following description, therefore, the elements corresponding to those in the first preferred embodiment are designated by the same reference characters in the drawings and description thereof will not be repeated.

Substrate-type terminal 3B is provided with an area larger than the area of substrate-type terminal 3 shown in the first preferred embodiment. Grooves 35A and 35B provided on the end surfaces located in the longitudinal direction of substrate body 31 do not overlap with external electrodes 22A and 22B of laminated capacitor 2, respectively, when viewed in the direction perpendicular or substantially perpendicular to the first main surface, and the entire arc-shaped or substantially arc-shaped portions of grooves 35A and 35B are exposed. Component connecting electrodes 32A and 32B provided on the top surface (first main surface) of substrate body 31 each have a width that does not include a prescribed dimension at both sides of the boundary line between the top surface and the first or second end surface of substrate body 31, and define a rectangular region extending inward for a prescribed distance from the boundary line.

With this configuration, the effect of significantly reducing or preventing the vibration noise similar to above is achieved. That is, distortion that occurs in laminated capacitor 2 is partially absorbed by viscoelastic resin 4 filling completely or substantially completely the space between laminated capacitor 2 and substrate-type terminals 3B, to significantly reduce or prevent the occurrence of acoustic noise in the circuit board. Moreover, since the substrate end surfaces of substrate-type terminal 3B and the component end surfaces of laminated capacitor 2 are significantly spaced apart from each other, the solder is prevented from wetting and spreading onto external electrodes 22A and 22B, thus facilitating the effect of significantly reducing or preventing the vibration sound.

The shape of external connecting electrodes 33A and 33B may be determined as appropriate depending on the shape of the mounting lands of the circuit board. Grooves 35A and 35B may be omitted. In this case, connecting electrodes 34A and 34B may be arranged as appropriate on the substrate end surfaces.

Fourth Preferred Embodiment

Figure 6A:
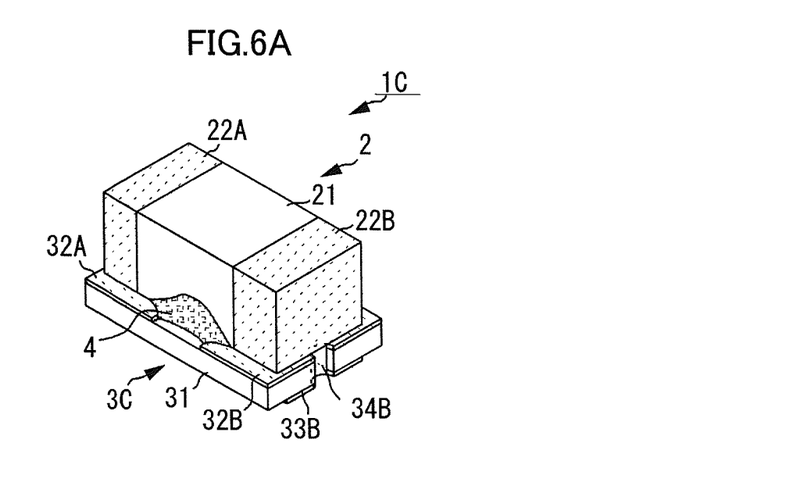
FIGS. 6A and 6B are a perspective view and a right-side view, respectively, showing the configuration of an electronic component according to a fourth preferred embodiment of the present invention.
Figure 6B:
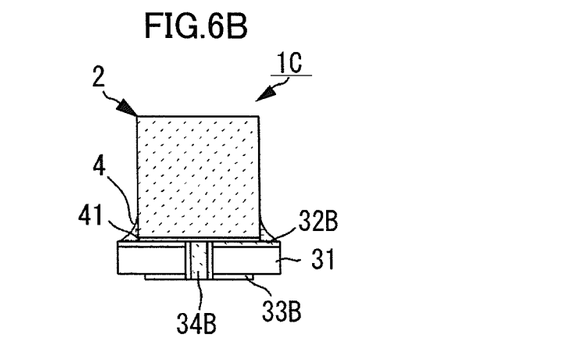

FIGS. 6A and 6B are a perspective view and a right-side view of an electronic component 1C according to a fourth preferred embodiment of the present invention, respectively.

Electronic component 1C in this preferred embodiment is preferably the same as electronic component 1 in the first preferred embodiment in structure of laminated capacitor 2, but is different in that a substrate-type terminal 3C of a different size is provided. In the following description, therefore, the elements corresponding to those in the first preferred embodiment are designated by the same reference characters in the drawings and description thereof will not be repeated.

The positions of substrate end surfaces of substrate-type terminal 3C located in the longitudinal direction thereof match the positions of laminated body end surfaces of laminated capacitor 2 located in the longitudinal direction thereof, and substrate side surfaces of substrate-type terminal 3C located in the lateral direction thereof lie outside of laminated body side surfaces of laminated capacitor 2 located in the lateral direction thereof.

With this configuration, the effect of significantly reducing or preventing the vibration noise similar to above is achieved. That is, distortion that occurs in laminated capacitor 2 is partially absorbed by viscoelastic resin 4 filling the space between laminated capacitor 2 and substrate-type terminals 3C, to significantly reduce or prevent the occurrence of acoustic noise in the circuit board. Moreover, since connecting electrodes 34A and 34B are provided on the arc-shaped or substantially arc-shaped side wall surfaces of grooves 35A and 35B, respectively, the solder hardly wets and spreads on a region outside of the outer shape of laminated capacitor 2 relative to grooves 35A and 35B, thus effectively significantly reducing or preventing an increase in height at which the solder wets and spreads on external electrodes 22A and 22B of laminated capacitor 2.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
a laminated capacitor including a laminated body including a dielectric layer and an internal electrode laminated therein, and a first external electrode and a second external electrode electrically connected to the internal electrode and located on opposite end surfaces of the laminated body located in a longitudinal direction thereof, respectively;
a substrate terminal including an insulative substrate body, a first component connecting electrode located on a first main surface of the substrate body on a side where the laminated capacitor is arranged, and connected to the first external electrode, a second component connecting electrode located on the first main surface of the substrate body and connected to the second external electrode, a first external connecting electrode located on a second main surface of the substrate body opposite to the first main surface, a second external connecting electrode located on the second main surface of the substrate body, a first connecting electrode connecting the first component connecting electrode to the first external connecting electrode, and a second connecting electrode connecting the second component connecting electrode to the second external connecting electrode; and
a viscoelastic resin located in a space between the substrate terminal and the laminated body of the laminated capacitor.

2. The electronic component according to claim 1, wherein the viscoelastic resin is provided between the end surfaces of the laminated body.

3. The electronic component according to claim 1, wherein the viscoelastic resin has a glass transition temperature of not less than about 20° C. and not more than about 70° C.

4. The electronic component according to claim 1, wherein the viscoelastic resin has a loss elastic modulus/a storage elastic modulus of not less than about 0.05 within a temperature range of not less than about 20° C. and not more than about 70° C.

5. The electronic component according to claim 1, wherein a side surface of the substrate terminal that is perpendicular or substantially perpendicular to the first main surface and extends in the longitudinal direction is coplanar with a side surface of the viscoelastic resin that is perpendicular or substantially perpendicular to the first main surface and extends in the longitudinal direction.

6. The electronic component according to claim 1, wherein
the substrate body is provided with a pair of grooves extending from opposite end surfaces of the substrate body located in the longitudinal direction to positions overlapping the laminated capacitor when viewed in a direction perpendicular or substantially perpendicular to the first main surface; and
the pair of grooves include the first connecting electrode and the second connecting electrode therein, respectively.

7. The electronic component according to claim 1, wherein the laminated body has a rectangular or substantially rectangular parallelepiped shape.

8. The electronic component according to claim 1, wherein the substrate body has a rectangular or substantially rectangular parallelepiped shape.

9. The electronic component according to claim 1, wherein a longitudinal dimension of the substrate body is not less than about 0.8 times than a longitudinal dimension of the laminated capacitor.

10. The electronic component according to claim 1, wherein a longitudinal dimension of the substrate body is not less than about 0.9 times than a longitudinal dimension of the laminated capacitor.

11. The electronic component according to claim 1, wherein a lateral dimension of the substrate body is not less than about 0.8 times than a lateral dimension of the laminated capacitor.

12. The electronic component according to claim 1, wherein a lateral dimension of the substrate body is not less than about 0.9 times than a lateral dimension of the laminated capacitor.

13. The electronic component according to claim 1, wherein a longitudinal dimension of the substrate body is not more than about 2.0 times than a longitudinal dimension of the laminated capacitor.

14. The electronic component according to claim 1, wherein a longitudinal dimension of the substrate body is not more than about 1.5 times than a longitudinal dimension of the laminated capacitor.

15. The electronic component according to claim 1, wherein a lateral dimension of the substrate body is not more than about 2.0 times than a lateral dimension of the laminated capacitor.

16. The electronic component according to claim 1, wherein a lateral dimension of the substrate body is not more than about 1.5 times than a lateral dimension of the laminated capacitor.

17. The electronic component according to claim 1, wherein the substrate body has a planar or substantially planar shape that is larger than a planar or substantially planar shape of the laminated capacitor.

18. The electronic component according to claim 1, wherein grooves are provided on the end surfaces of the substrate body and extend below bottom surfaces of external electrodes of the laminated capacitor.

19. The electronic component according to claim 1, wherein
the grooves do not overlap with the external electrodes of the laminated capacitor when viewed in a direction perpendicular or substantially perpendicular to the first main surface such that arc-shaped or substantially arc-shaped portions of the grooves are exposed.

* * * * *